US012446881B2

(12) United States Patent
Fleury et al.

(10) Patent No.: US 12,446,881 B2
(45) Date of Patent: Oct. 21, 2025

(54) DEVICES, SYSTEMS, AND METHODS FOR ANCHORING TISSUE

(71) Applicant: Boston Scientific Scimed, Inc., Maple Grove, MN (US)

(72) Inventors: Sean P. Fleury, Princeton, MA (US); Jason Weiner, Grafton, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 182 days.

(21) Appl. No.: 17/404,600

(22) Filed: Aug. 17, 2021

(65) Prior Publication Data
US 2022/0192670 A1    Jun. 23, 2022

Related U.S. Application Data

(60) Provisional application No. 63/128,442, filed on Dec. 21, 2020.

(51) Int. Cl.
*A61B 17/04* (2006.01)
*A61B 17/11* (2006.01)
(Continued)

(52) U.S. Cl.
CPC ...... *A61B 17/1114* (2013.01); *A61B 17/0482* (2013.01); *A61B 2017/1103* (2013.01); *A61B 2017/1135* (2013.01)

(58) Field of Classification Search
CPC . A61B 17/11; A61B 17/1114; A61B 17/0482; A61B 17/0401;
(Continued)

(56) References Cited

U.S. PATENT DOCUMENTS 7,645,268 B2 *  1/2010  Mickley .............. A61M 5/3286
                                                    604/274
7,780,701 B1 *  8/2010  Meridew ............ A61B 17/0401
                                                    606/232
(Continued)

FOREIGN PATENT DOCUMENTS

EP    2588007 A2    5/2013
EP    3154446 A1    4/2017

OTHER PUBLICATIONS

Author Unknown, "JuggerKnot and JuggerKnotless Soft Anchor" Zimmer Biomet—retrieved Oct. 5, 2020.
(Continued)

*Primary Examiner* — Ryan J. Severson
*Assistant Examiner* — Lindsey R. Rivers
(74) *Attorney, Agent, or Firm* — Seager, Tufte & Wickhem, LLP

(57) ABSTRACT

Devices, systems, and methods for drawing tissue walls together using a first tissue anchoring element and a second tissue anchoring element spaced apart from each other. The first tissue anchoring element is thinner than the second tissue anchoring element. The first tissue anchoring element may be a suture, optionally including a suture anchor. The second tissue anchoring element may be an expandable tissue anchoring element, such as a stent, expandable from a delivery configuration to a deployed configuration. The second tissue anchoring element may have a passage therethrough allowing passage of materials through the tissue walls, and creating an anastomosis therebetween.

20 Claims, 7 Drawing Sheets

(51) Int. Cl.
   *A61B 17/00* (2006.01)
   *A61B 17/06* (2006.01)
(58) Field of Classification Search
   CPC .... A62B 2017/0409; A62B 2017/0417; A62B 2017/1139; A62B 2017/1103; A62B 2017/1135
   See application file for complete search history.

(56) References Cited

U.S. PATENT DOCUMENTS

| | | | | |
|---|---|---|---|---|
| 8,858,576 | B2 * | 10/2014 | Takahashi | A61B 17/064 606/151 |
| 9,649,103 | B2 * | 5/2017 | Arai | A61B 17/0401 |
| 10,076,330 | B2 | 9/2018 | Sander et al. | |
| 2006/0135971 | A1 * | 6/2006 | Swanstrom | A61B 17/0469 606/153 |
| 2011/0137394 | A1 * | 6/2011 | Lunsford | A61B 17/1114 606/45 |
| 2011/0160768 | A1 * | 6/2011 | Stone | A61B 17/0482 606/232 |
| 2013/0090526 | A1 * | 4/2013 | Suzuki | A61B 17/0469 600/114 |
| 2016/0051246 | A1 * | 2/2016 | Durando | A61B 17/0401 606/232 |
| 2018/0271530 | A1 | 9/2018 | Dayton et al. | |
| 2020/0187946 | A1 | 6/2020 | Baron et al. | |

OTHER PUBLICATIONS

Author Unknown, "Expect Slimline (SL) Endoscopic Ultrasound Aspiration Needle" Boston Scientific—retrieved Nov. 6, 2020.
International Search Report and Written Opinion for the International Patent Application No. PCT/US2021/046308, mailed Dec. 2, 2021, 36 pages.

* cited by examiner

DEVICES, SYSTEMS, AND METHODS FOR ANCHORING TISSUE

PRIORITY

The present application is a non-provisional of, and claims the benefit of priority under 35 U.S.C. § 119 to, U.S. Provisional Application Ser. No. 63/128,442, filed Dec. 21, 2020, the disclosure of which is hereby incorporated herein by reference in its entirety for all purposes.

FIELD

The present disclosure relates generally to the field of devices, systems, and methods for joining tissue. More particularly, the present disclosure relates to devices, systems, and methods for anchoring apposed tissues, such as to create an anastomosis.

BACKGROUND

To create an anastomosis, multiple devices may be needed to locate and position at the target tissue. A guidewire may be utilized to enhance device exchange, although the guidewire may not remain in the desired position, so that the time of the procedure increases for guidewire repositioning. Additionally, the guidewire may not be able to maintain tissues in close apposition during the device exchange. Accordingly, improvements to devices, systems, and method for bringing together tissue walls and holding the walls together, such as to create an anastomosis, would be welcome.

SUMMARY

This summary of the disclosure is given to aid understanding, and one of skill in the art will understand that each of the various aspects and features of the disclosure may advantageously be used separately in some instances, or in combination with other aspects and features of the disclosure in other instances. No limitation as to the scope of the claimed subject matter is intended by either the inclusion or non-inclusion of elements, components, or the like in this summary.

In accordance with one aspect of the present disclosure, a system for anchoring tissue includes a flexible elongate member having at least one lumen defined therethrough, a first tissue-penetrating element, a first anchoring element having an outer diameter, a second tissue-penetrating element, and a second anchoring element having an outer diameter in a deployed configuration, with the outer diameter of the first anchoring element less than half the outer diameter of the second anchoring element in the deployed configuration.

In some embodiments, the first tissue-penetrating element has a sharpened distal end configured to penetrate the tissue at a first location to deliver the first anchoring element to the tissue; and the second tissue-penetrating element has a sharpened distal end configured to penetrate the tissue at a second location spaced apart from the first location to deliver the second anchoring element to the tissue. In some embodiments, the first tissue-penetrating element distal end has an outer diameter; and the second tissue-engaging portion distal end has an outer diameter greater than the outer diameter of the first tissue-penetrating element distal end. In some embodiments, the first anchoring element is a suture; and the second anchoring element is expandable from a delivery configuration with a delivery configuration outer diameter greater than twice the thickness of the suture, to a deployed configuration with a deployed outer diameter greater than the delivery configuration outer diameter. In some embodiments, the outer diameter of the second tissue-penetrating element distal end is sized to create a passage through the tissue through which the second anchoring element may pass in the delivery configuration.

In some embodiments, first anchoring element is a suture thread and loops around the distal end of the first tissue-penetrating element.

In some embodiments, the first tissue-penetrating element is a needle with blunt grooves through which the suture thread extends and is carried to the tissue, and sharp regions for penetrating the tissue to carry the suture element through the tissue.

In accordance with another aspect of the present disclosure, a system for anchoring tissue includes a flexible elongate member having at least one lumen defined therethrough; a first tissue-penetrating element extendable through the flexible elongate member; a suture element; a second tissue-penetrating element extendable through the flexible elongate member; and a stent.

In some embodiments, the first tissue-penetrating element has a distal end configured to penetrate the tissue at a first location to deliver the suture element through the tissue at the first location; and the second tissue-penetrating element is configured to deliver the second anchoring element to the tissue and has a sharpened distal end configured to penetrate the tissue at a second location spaced apart from the first location.

In some embodiments, the suture element is a suture thread; the first tissue-penetrating element is a needle with blunt grooves through which the suture thread extends and is carried to the tissue, and sharp regions for penetrating the tissue to carry the suture element through the tissue; and the suture element further includes a suture anchor positioned along the suture thread and extending in the blunt grooves of the needle.

In some embodiments, the suture element further includes a suture anchor positioned along the suture thread at the distal end of the first tissue-penetrating element.

In some embodiments, the suture element and the stent are delivered to the tissue at a distal end of the system; the system further includes a control handle at a proximal end of the system; and the suture thread has suture legs extending proximally to the control handle for access by a user. In some embodiments, the system further includes a suture delivery device extending distally from the control handle and having a wall defining a lumen therethrough through which the first tissue-penetrating element and the suture extend distally to the tissue, where at least one hole is defined in the suture delivery device wall through which the suture legs pass to extend along the control handle. In some embodiments, the control handle includes guides through which the suture legs extend.

In accordance with another aspect of the present disclosure, a method of drawing tissue walls together includes inserting a suture element through a first location on a proximal tissue wall and through a distal tissue wall; securing the suture element relative to the tissue walls; moving the suture element proximally to draw the distal tissue wall proximally towards the proximal tissue wall; holding the proximal and distal tissue walls together with the suture element; and inserting a tissue anchoring element through a second location on the proximal tissue wall spaced apart from the first location, and through the distal tissue wall.

In some embodiments, the suture element and the tissue anchoring element are inserted through a delivery device, the method further including securing the suture element in place relative to the tissue walls to remain in place after withdrawal of the delivery device.

In some embodiments, the suture element and the tissue anchoring element are inserted through a delivery device, the method further including releasing the suture element after insertion of the tissue anchoring element and withdrawal of the delivery device to allow the suture element to be released from the tissue walls.

In some embodiments, the tissue walls are sections of the digestive tract; and the tissue anchoring element is a stent having a passage therethrough to create an anastomosis connecting the sections of the digestive tract.

These and other features and advantages of the present disclosure, will be readily apparent from the following detailed description, the scope of the claimed invention being set out in the appended claims. While the following disclosure is presented in terms of aspects or embodiments, it should be appreciated that individual aspects can be claimed separately or in combination with aspects and features of that embodiment or any other embodiment.

BRIEF DESCRIPTION OF THE DRAWINGS

Non-limiting embodiments of the present disclosure are described by way of example with reference to the accompanying drawings, which are schematic and not intended to be drawn to scale. The accompanying drawings are provided for purposes of illustration only, and the dimensions, positions, order, and relative sizes reflected in the figures in the drawings may vary. For example, devices may be enlarged so that detail is discernable, but is intended to be scaled down in relation to, e.g., fit within a working channel of a delivery catheter or endoscope. In the figures, identical or nearly identical or equivalent elements are typically represented by the same reference characters, and similar elements are typically designated with similar reference numbers differing in increments of 100, with redundant description omitted. For purposes of clarity and simplicity, not every element is labeled in every figure, nor is every element of each embodiment shown where illustration is not necessary to allow those of ordinary skill in the art to understand the disclosure.

The detailed description will be better understood in conjunction with the accompanying drawings, wherein like reference characters represent like elements, as follows.

DETAILED DESCRIPTION

Figure 1:
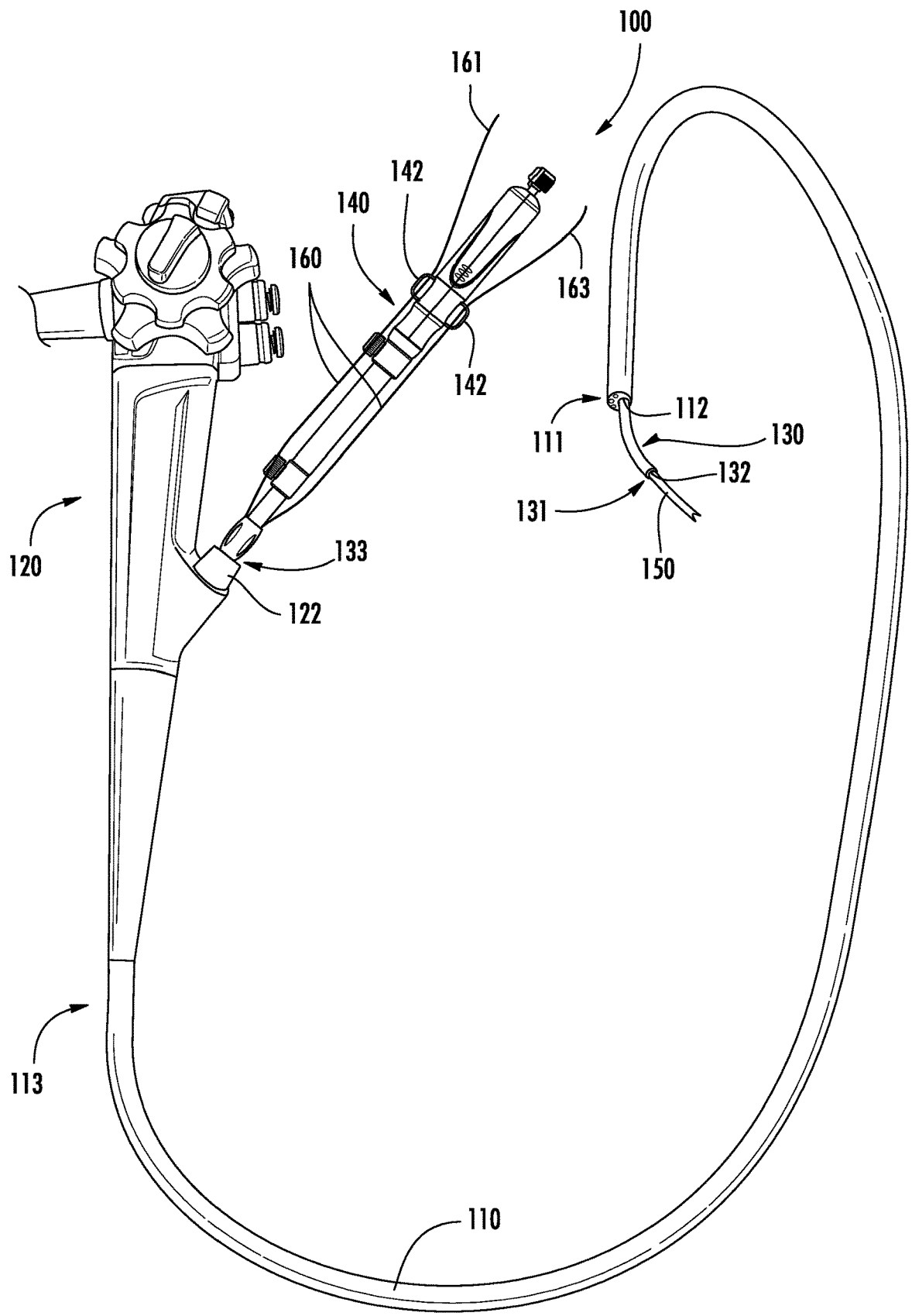
FIG. 1 is perspective view of a system for drawing and keeping together tissue walls in accordance various principles of the present disclosure.

The following detailed description should be read with reference to the drawings, which depict illustrative embodiments. It is to be understood that the disclosure is not limited to the particular embodiments described, as such may vary. All apparatuses and systems and methods discussed herein are examples of apparatuses and/or systems and/or methods implemented in accordance with one or more principles of this disclosure. Each example of an embodiment is provided by way of explanation and is not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

It will be appreciated that the present disclosure is set forth in various levels of detail in this application. In certain instances, details that are not necessary for one of ordinary skill in the art to understand the disclosure, or that render other details difficult to perceive may have been omitted. The terminology used herein is for the purpose of describing particular embodiments only, and is not intended to be limiting beyond the scope of the appended claims. Unless defined otherwise, technical terms used herein are to be understood as commonly understood by one of ordinary skill in the art to which the disclosure belongs. All of the devices and/or methods disclosed and claimed herein can be made and executed without undue experimentation in light of the present disclosure.

As used herein, "proximal" refers to the direction or location closest to the user (medical professional or clinician or technician or operator or physician, etc., such terms being used interchangeably without intent to limit or otherwise, and including automated controller systems), etc., such as when using a device (e.g., introducing the device into a patient, or during implantation, positioning, or delivery), and "distal" refers to the direction or location furthest from the user, such as when using the device (e.g., introducing the device into a patient, or during implantation, positioning, or delivery). "Longitudinal" means extending along the longer or larger dimension of an element. "Central" means at least generally bisecting a center point, and a "central axis" means, with respect to an opening, a line that at least generally bisects a center point of the opening, extending longitudinally along the length of the opening when the opening comprises, for example, a tubular element, a channel, a cavity, or a bore.

The present disclosure addresses various surgical procedures in which two tissue walls are brought together, such as into close apposition, to create an anastomosis. One example of a procedure in which tissue wall are brought together is a gastric outlet obstruction or bypass procedure. Gastric outlet obstruction may be performed by a multi-step endoscopic ultrasound ("EUS") procedure. The pylorus may initially be injected with a large bolus of saline to fill the duodenum to assist with locating the small bowel under ultrasound. Using an EUS scope, the small bowel is identified or located through the stomach wall, and a needle is used to puncture the stomach wall and extend into the bowel to create a pathway for an anchoring element for holding the stomach wall and duodenal wall in apposition. The needle is then exchanged with a deployment device for the anchoring element. The deployment device may include a cauterization device for cauterizing the tissue walls. The anchoring device may be deployed after cauterization to create the anastomosis.

Currently, a guidewire is used to perform the exchange from needle to deployment device and/or to facilitate passage of the anchoring device through apposed tissue walls. However, such guidewire generally cannot always withstand pulling forces necessary to maintain the tissue walls in apposition during such procedure, and the guidewire may get pulled out during the exchange. Advancing the guidewire further into the small bowel (e.g., further than necessary for the anchor placement), may present a safety risk to the patient. Additionally, if access is lost, the physician needs to reattempt the procedure. This leads to a prolonged procedure, and/or additional puncture holes which increases risk of sepsis/infection and increased time needed to heal. The solution of switching to a NOTES (natural orifice transluminal endoscopic surgery) method may present heightened risk to the patient, and is not a method most physicians are comfortable with.

In some procedures, a tissue wall anchoring element (which may also be referenced as an anchor, anchor device, anchor mechanism, anchor component, anchoring element, anchoring device, anchoring mechanism, anchoring component, and the like, without intent to limit) is used to hold the tissue walls together in apposition, and optionally also to create the anastomosis. The anchoring element may have a lumen or passage defined therethrough. The lumen may be configured to allow materials (e.g., fluids) to pass or drain across the tissue walls, such as between body cavities or body lumens. In some procedures, the delivery device for the anchoring element has a distal cutting end (e.g., a sharp end, or a cauterizing tip) which creates the passage through the apposed tissue walls through which the anchoring element is passed and deployed.

In accordance with various principles of the present disclosure, it may be desirable to maintain the tissue walls which are to form the anastomosis in closer apposition before passing an anchoring element therethrough. Generally, it may be desirable to reduce any potential communication between the interior of the lumens and/or organs to be anastomosed. For instance, in the case of a gastrointestinal anastomosis (e.g., a gastrojejunostomy), it is desirable to minimize communication between the generally nonsterile interior of the digestive tract with the generally sterile peritoneal cavity, such as to minimize the risk of infection. In addition, if the tissue walls are maintained in close apposition during passage of an anchoring element therethrough, passage of the anchoring element through the tissue walls may be facilitated. Moreover, the anchoring element may be considered to pass from a sterile environment to another sterile environment if the tissue walls are held in close apposition.

In accordance with various principles of the present disclosure, a suture element is used to hold two tissue walls together in apposition at a first location. As the suture element holds the tissues in apposition (and may thus be considered an initial or first tissue anchoring element), an additional tissue anchoring element is deployed to join the two tissue walls at a second location spaced apart from the first location. The suture element (alternately referenced herein as simply a suture for the sake of convenience and without intent to limit) may be a strand of material as known in the art for approximating tissues, with a thickness generally sufficient to provide the desired holding strength while passing through a tissue puncture hole with a minimal diameter.

In some embodiments, the suture element is a loop of suture such as a doubled extent of an elongated thread-like suture, with the middle region positioned at the apposition site within a patient and the two free ends outside the patient. The free ends of a loop of suture may be held outside the patient where the medical professional may grasp and pull on the suture as needed or desired during the procedure. The delivery system may include a control handle provided with guides for the suture ends. In further embodiments, a substantially central portion or region of the suture loop may include a suture anchor, such as a widened area of the suture. In some embodiments, the suture anchor includes flexible wings which extend away from the elongate thread-like extent of surrounding portions of the suture (on either side of the suture anchor). The suture element may or may not be left in place holding the apposed tissues together while a further tissue anchoring element is positioned, such as to create an anastomosis.

The further tissue anchoring element may alternately be referenced herein as a tissue fastener, tissue fastening element, stent, or the like without intent to limit. For the sake of convenience, and without intent to limit, reference will generally be made herein to a stent, such as to differentiate from the suture element which may also be considered a tissue anchoring element. The stent may be an expandable stent capable of expanding from a collapsed compact delivery configuration to an expanded configuration for extension and deployment through apposed tissue walls. In some embodiments, the stent includes a lumen or passageway therethrough to permit passage of materials (e.g., to allow passage from a first organ or lumen to a second organ or lumen, and/or for drainage purposes) through the tissue walls fastened by the suture element and the stent.

Embodiments of devices, systems, and methods for anchoring together tissue walls in accordance with various aspects of the present disclosure will now be described with reference to examples illustrated in the accompanying drawings. Reference in this specification to "one embodiment," "an embodiment," "some embodiments", "other embodiments", etc. indicates that one or more particular features, structures, and/or characteristics in accordance with principles of the present disclosure may be included in connection with the embodiment. However, such references do not necessarily mean that all embodiments include the particular features, structures, and/or characteristics, or that an embodiment includes all features, structures, and/or characteristics. Some embodiments may include one or more such features, structures, and/or characteristics, in various combinations thereof. Moreover, references to "one embodiment," "an embodiment," "some embodiments", "other embodiments", etc. in various places in the specification are not necessarily all referring to the same embodiment, nor are separate or alternative embodiments necessarily mutually exclusive of other embodiments. When particular features, structures, and/or characteristics are described in connection with one embodiment, it should be understood that such features, structures, and/or characteristics may also be used in connection with other embodiments whether or not explicitly described, unless clearly stated to the contrary. It should further be understood that such features, structures, and/or characteristics may be used or present singly or in various combinations with one another to create alternative embodiments which are considered part of the present disclosure, as it would be too cumbersome to describe all of the numerous possible combinations and subcombinations of features, structures, and/or characteristics. Moreover, various features, structures, and/or characteristics are described which may be exhibited by some embodiments and not by others. Similarly, various features, structures, and/or characteristics or requirements are described which may be features, structures, and/or characteristics or requirements for some embodiments but may not be features, structures, and/or characteristics or requirements for other embodiments. Therefore, the present invention is not limited to only the embodiments specifically described herein.

Turning now to the drawings, a system 100 for bringing together tissue walls, such as to create an anastomosis therebetween, is illustrated in FIG. 1. It will be appreciated that reference is made to various terms or phrases (in various conjugations thereof) such as bringing together, drawing together, joining, connecting, anchoring together, etc. without intent to limit, and that such terms or phrases (and various conjugations thereof) may be used interchangeably herein without intent to limit. The system 100 includes a delivery device 110 such as a flexible elongate member (e.g., an endoscope, a sheath, a catheter, a tubular element, or the like) having a lumen 112 through which anchoring elements and other components of the system 100 may be delivered (through the distal end 111 of the delivery device 110) to a treatment site within a patient where tissue walls are to be drawn together. The tissue walls may be walls of body lumens or walls of organs (e.g., the stomach). For instance, the proximal tissue wall PTW may be the stomach wall, and the distal tissue wall DTW may be the apposing wall of the jejunum (as illustrated in FIGS. 4A-4F). Reference is made herein to a "treatment site" for the sake of convenience, and without intent to limit, as the apposing regions of tissue walls to be joined together such as to form an anastomosis. A control handle 120 may be provided at a proximal end 113 of the delivery device 110 to control the delivery device 110 and/or other components of the system 100. The control handle 120 may include one or more ports 122 through which components of the system 100 may be passed, such as through the delivery device 110. In the illustrated example, the system 100 includes an additional delivery device (e.g., a sheath, a catheter, a tubular element, or the like), referenced herein as an e-tube 130 for the sake of convenience without intent to limit, delivered through the delivery device 110 via one of the ports 122. The e-tube 130 has a lumen 132 defined therethrough for delivering a component of the system 100 through the distal end 131 of the e-tube 130. An e-tube control handle 140 may be provided at a proximal end 133 of the e-tube 130 such as to navigate the e-tube 130 through the patient. It will be appreciated that the term navigate, and conjugations thereof, may be used interchangeably herein with terms such as control, direct, move, maneuver, manipulate, etc., without intent to limit.

Figure 2:
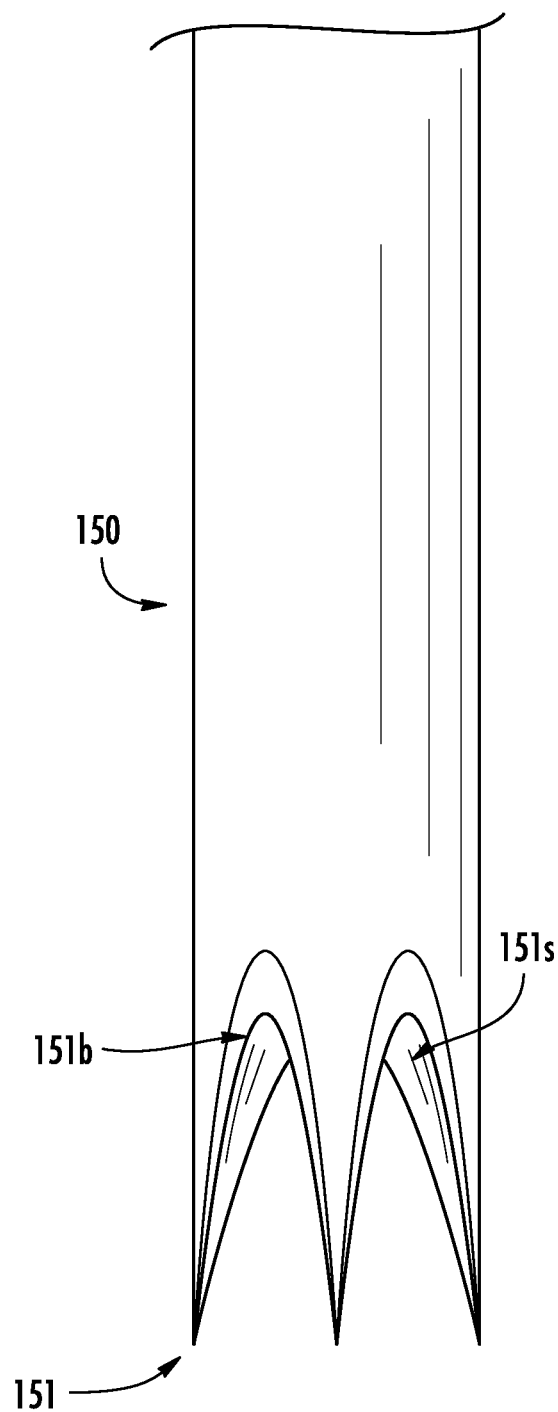
FIG. 2 is a perspective view of an example of a tissue penetrating element which may be used with a system as illustrated in FIG. 1 in accordance with various principles of the present disclosure.

In accordance with various principles of the present disclosure, the system 100 further includes a tissue-penetrating element 150 configured to be delivered via the e-tube 130 to the treatment site. The tissue-penetrating element 150 may be any elongated element sufficiently flexible to extend through the e-tube 130 and out the distal end 131 of the e-tube 130. Moreover, the tissue-penetrating element 150 has a sharpened distal end or tip 151 or other configuration capable of penetrating the proximal tissue wall PTW and distal tissue wall DTW at the treatment site. An example of a tissue-penetrating element 150 is illustrated in FIG. 2 in the form of a Franseen type needle, although other configurations are with the scope of the present disclosure.

In accordance with some aspects of the present disclosure, the tissue-penetrating element 150 may be configured not only to penetrate the tissue walls PTW and DTW to be brought together, but also to deliver a suture element configured to join the tissue walls. The tissue-penetrating element 150 thus may be considered a delivery device. The tissue-penetrating element 150 may further be configured to deploy the suture element 160 across the tissue walls PTW and DTW to hold the tissue walls PTW and DTW together in apposition, such as in close apposition, such as will be described in further detail below with reference to FIGS. 4A-4E, 5, and 6. Accordingly, a tissue-penetrating element 150 may be configured with a sharp distal end region 151*s* to assist with tissue penetration, as well as a dull or blunt distal end region 151*b* along which the suture element 160 may extend without risk of damage to the suture element 160. In some embodiments, the tissue-penetrating element 150 is a multi-prong fork-tip or Franseen style needle with deeper cuts than standard Franseen style needles. Franseen and fork-tip needles are considered end-type cutting needles due to their opposing bevel tip design. Two opposing grooves would be dull or blunt, forming the blunt distal end region 151*b* of the tissue-penetrating element 150, and the other two opposing grooves would be sharp to aid in cutting through the tissue wall, forming the sharp distal end region 151*s* of the tissue-penetrating element 150. The dull grooves would allow the suture element 160 to rest therein without being damaged by the sharp grooves. The e-tube 130 may serve to protect the delivery device 110 from the sharp distal end 151 of the tissue-penetrating element 150 and/or to keep the suture element 160 in place during delivery to the treatment site TS.

Figure 3:
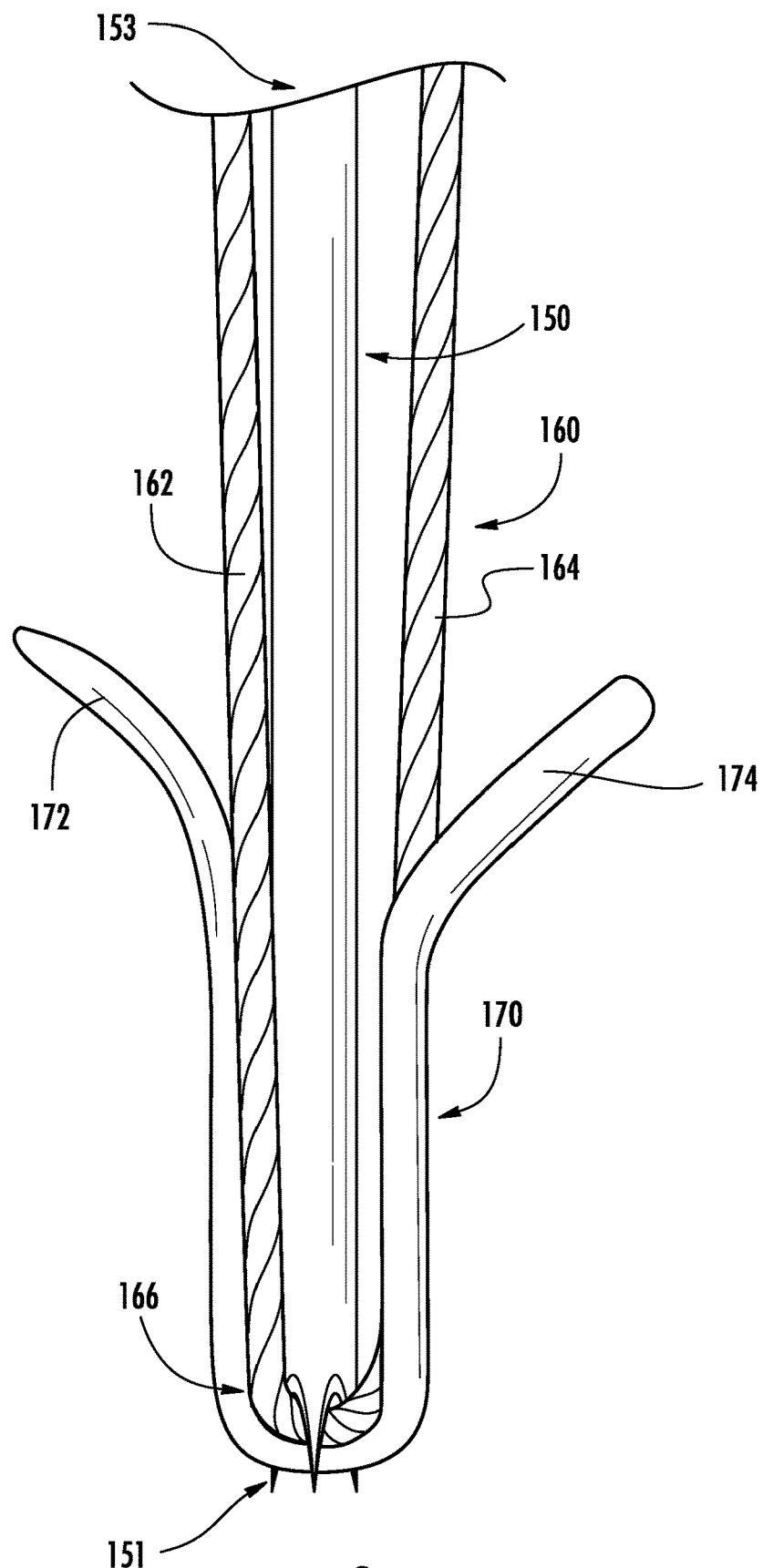
FIG. 3 is a perspective view of an example of a suture element which may be used with a system as illustrated in FIG. 1 in accordance with various principles of the present disclosure.

As illustrated in FIG. 3, the suture element 160 is formed of a suture, such as known in the art. In some embodiments, the suture element is a loop of suture, with two legs 162, 164 (which may alternately be referenced herein as lines or extents or the like without intent to limit) extending along the length of the tissue-penetrating element 150 between the distal end 151 of the tissue-penetrating element 150 and the proximal end 153 of the tissue-penetrating element 150. The suture element 160 extends (loops) around the distal end 151 of the tissue-penetrating element 150, as illustrated in FIG. 3. In some embodiments, the region of the suture element 160 extending along the distal end 151 of the tissue-penetrating element 150 is wider than surrounding regions (such as extending proximally, away from the distal end 151 of the tissue-penetrating element 150). The suture lines 162, 164 may run from the distal end 151 of the tissue-penetrating element 150 towards the proximal end 153 of the tissue-penetrating element 150 along the outside of the tissue-penetrating element 150 and under (e.g., within) the e-tube 130 (or through the tissue-penetrating element 150 if formed with a lumen therethrough) and proximally to the proximal end 113 of the system 100. The length of the suture line from the distal end 151 of the tissue-penetrating element 150 to the control handles 120, 140 at the proximal end 103 of the system 100 (FIG. 1) may be determined based on the location to which the suture element 160 is to be anchored so that the medical professional can effectively access and control the suture element 160 (e.g., manipulate and/or apply tension thereto) at the proximal end 103 of the system 100. Typically, the suture element 160 extends approximately midway to the distal end 151 of the tissue-penetrating element 150, with a middle region 166 of the suture element 160 looping around the distal end 151 of the tissue-penetrating element 150 and the suture lines 162, 164 on either side of the middle regions 166 extending proximally towards the control handles 120, 140 at the proximal end 103 of the system 100.

As illustrated in FIG. 1, the free ends 161, 163 of the suture element 160 (e.g., at the ends of each of the suture legs 162, 164 positioned outside the patient if a loop of suture element 160 is inserted) preferably are accessible by the medical professional performing the procedure with the system 100 to control the suture element 160, such as to apply tension to the suture element 160 or otherwise to maneuver the suture element 160, as will be described in greater detail below. For instance, the suture element distal ends 161, 163 may extend proximally to a location outside the e-tube 130, such as along the e-tube control handle 140. In some embodiments, the suture element distal ends 161, 163 feed through one or two holes in the wall of the e-tube 130 at the proximal end 133 thereof (and through holes in the tissue-penetrating element 150 if the suture runs through a lumen in the tissue-penetrating element 150), as illustrated in FIG. 1. The suture element distal ends 161, 163 may then run along the outside of the e-tube control handle 140. The e-tube control handle 140 may include suture guides 142 shaped, configured, positioned, etc., to hold the suture element distal ends 161, 163 in place, such as via a press fit to keep tension on the suture (e.g., for a single channel or a dual channel scope). The guides 142 may be on opposite sides of the e-tube control handle 140 or on the same side of the e-tube control handle 140. The suture element 160 preferably extends far enough (the suture element distal ends 161, 163 are long enough) to allow for removal of the tissue-penetrating element 150 while leaving the suture element 160 in place without losing tension or position, for reasons as will become more evident below.

In some embodiments, the suture element 160 includes an additional component. As illustrated in FIG. 3, the suture element 160 may include as a suture anchor 170. In some embodiments, the suture anchor 170 includes flexible wings 172, 174 which are in a collapsed configuration when extending within the lumen 132 within the e-tube 130 and/or tissue-penetrating element 150 for delivery to the treatment site. The suture anchor wings 172, 174 may flare out upon deployment (e.g., exiting the distal end 131 of the e-tube 130 and/or the distal end 151 of the tissue-penetrating element 150) to provide anchoring. The suture anchor 170 may provide a greater surface area for contact with tissue than provided by a suture element 160 without a suture anchor 170. The suture element 160 and the suture anchor 170 are soft and therefore would not cause any significant tissue damage even when pulled in tension.

The suture element 160 may be considered a tool or device that anchors the tissue walls PTW and DTW to maintain access to both walls during formation of an anastomosis, such as during device exchange, as will now be described with reference to FIGS. 4A-4F.

Figure 4A:
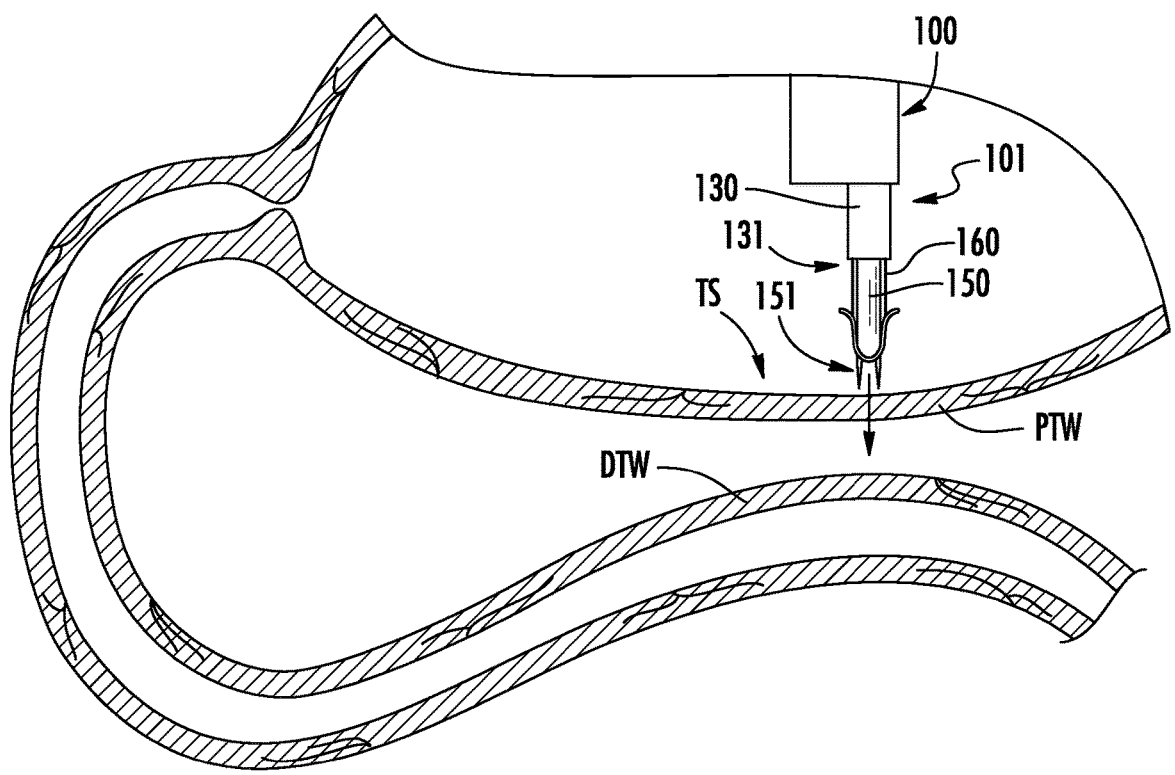
FIGS. 4A-4F illustrate sequential positions of components of a system such as in FIG. 1 creating an anastomosis in accordance with various principles of the present disclosure.

As illustrated in FIG. 4A, the treatment site TS is approached by the distal end 101 of the system 100 to identify a puncture site PS, such as with the use of endo-scopic ultrasound (EUS), such as known in the art, or any other known or heretofore known procedure. In the example of an embodiment described herein, the puncture site PS is from the stomach into the small bowel. As may be appreciated, the distal end 151 of the tissue-penetrating element 150 may be distally extended from the distal end 131 of the e-tube 130 and towards the puncture site PS. The suture element 160 may be carried along the distal end 161 of the suture element 160. Alternatively, the suture element 160 may be carried within the lumen (working channel) of the e-tube 130 or tissue-penetrating element 150 and passed distally outward for deployment.

Figure 4B:
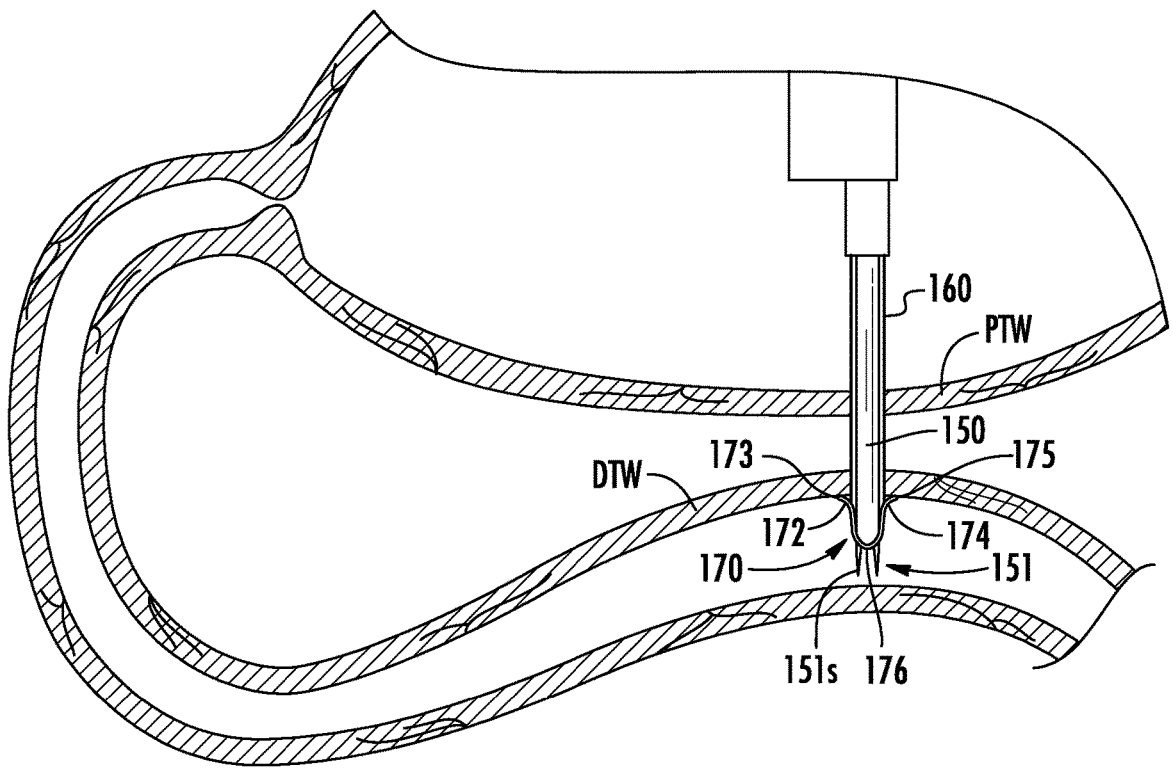
Figure 4C:
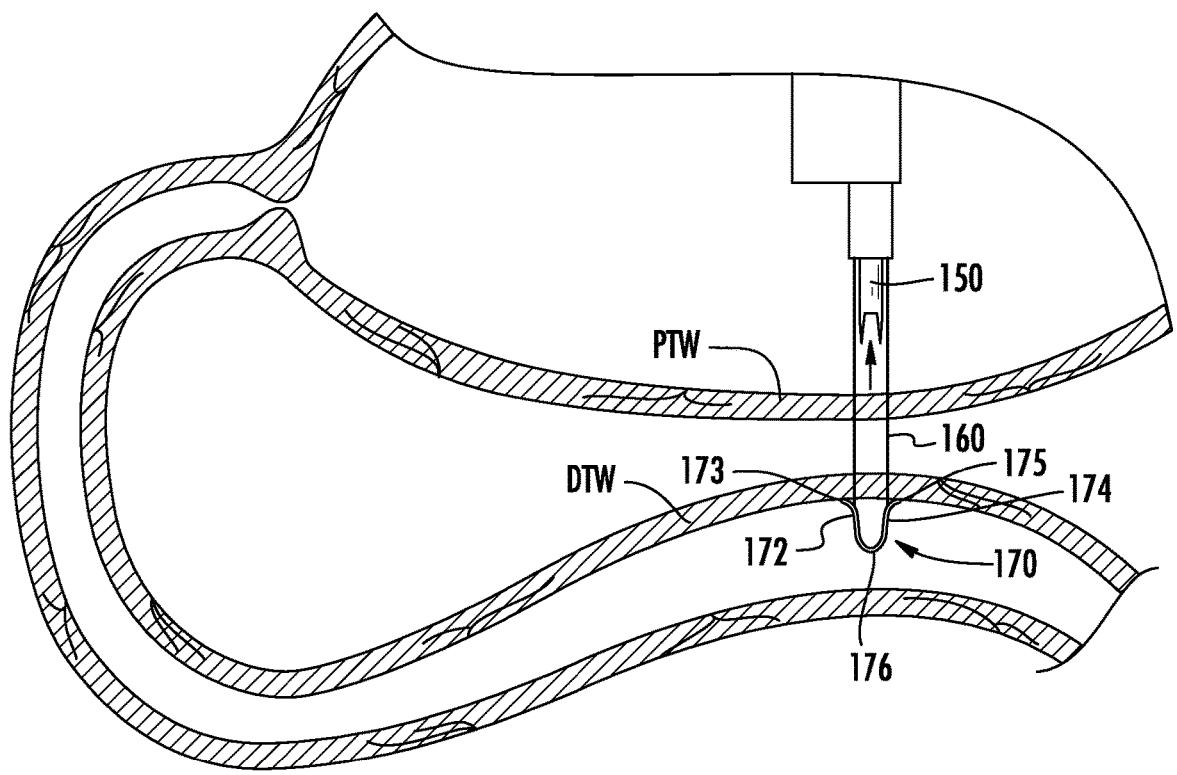

The distal end 151 of the tissue-penetrating element 150 (e.g., the sharp distal end region 151s) is advanced distally to puncture through the tissue walls PTW and DTW, carrying the suture element 160 therethrough, as illustrated in FIG. 4B. The suture element is secured relative to the tissue walls PTW and DTW, such as on a distal side of the distal tissue wall DTW. If a suture anchor 170 is provided on the suture element 160, suture anchor wings 172, 174 are advanced so that their respective free ends 173, 175 (unattached ends, distal to the middle region 176 coupled to the suture element 160) are positioned distally beyond the distal tissue wall DTW (e.g., within the small bowel, such as within the jejunum). The tissue-penetrating element 150 may then be retracted proximally, as illustrated in FIG. 4C.

Figure 4D:
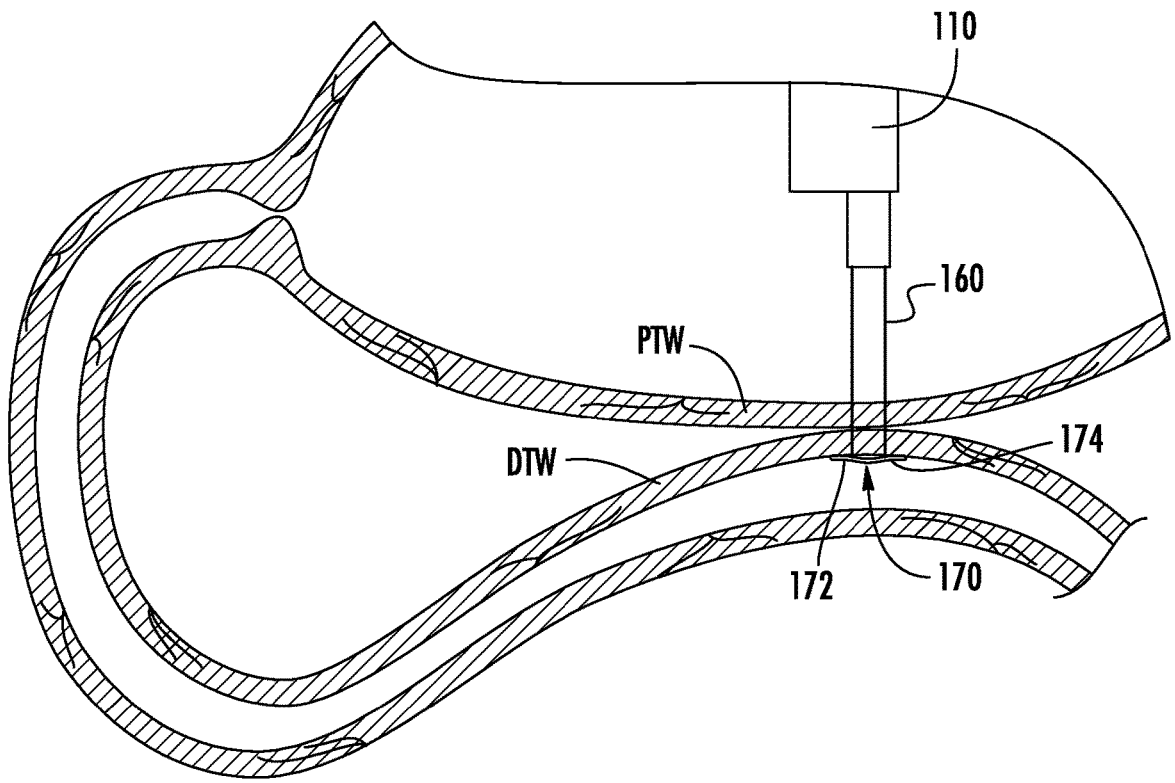

Either during or after retraction of the tissue-penetrating element 150, tension may be applied to the suture element 160. As illustrated in FIG. 4D, application of tension on the suture element 160 (e.g., via proximally located suture element free ends 161, 163 accessible along the control handle 120, such as along the e-tube control handle 140) brings the tissue walls PTW and DTW together. If a suture anchor 170 is provided, such proximal motion also flexes or spreads the suture anchor wings 172, 174 against the distal side of the distal tissue wall DTW to distribute forces along the tissue walls PTW and DTW. The tissue-penetrating element 150 may be removed from the patient while maintaining tension on the suture element 160 (such as if a single channel delivery device 110 is used), leaving the suture element 160 in place holding the tissue walls PTW and DTW together.

It will be appreciated that other techniques may be used to extend a suture element 160 through the tissue walls PTW and DTW to hold the tissue walls PTW and DTW together without departing from the scope and spirit of the present disclosure.

Figure 4E:
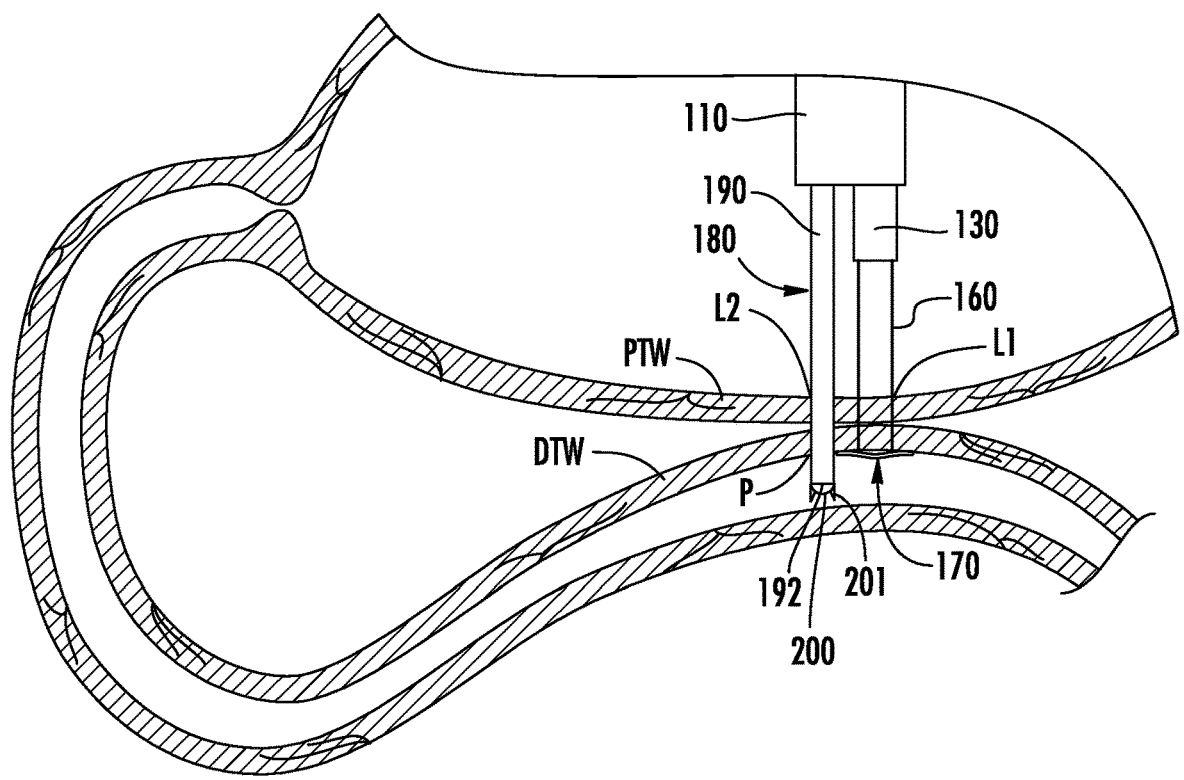
Figure 4F:
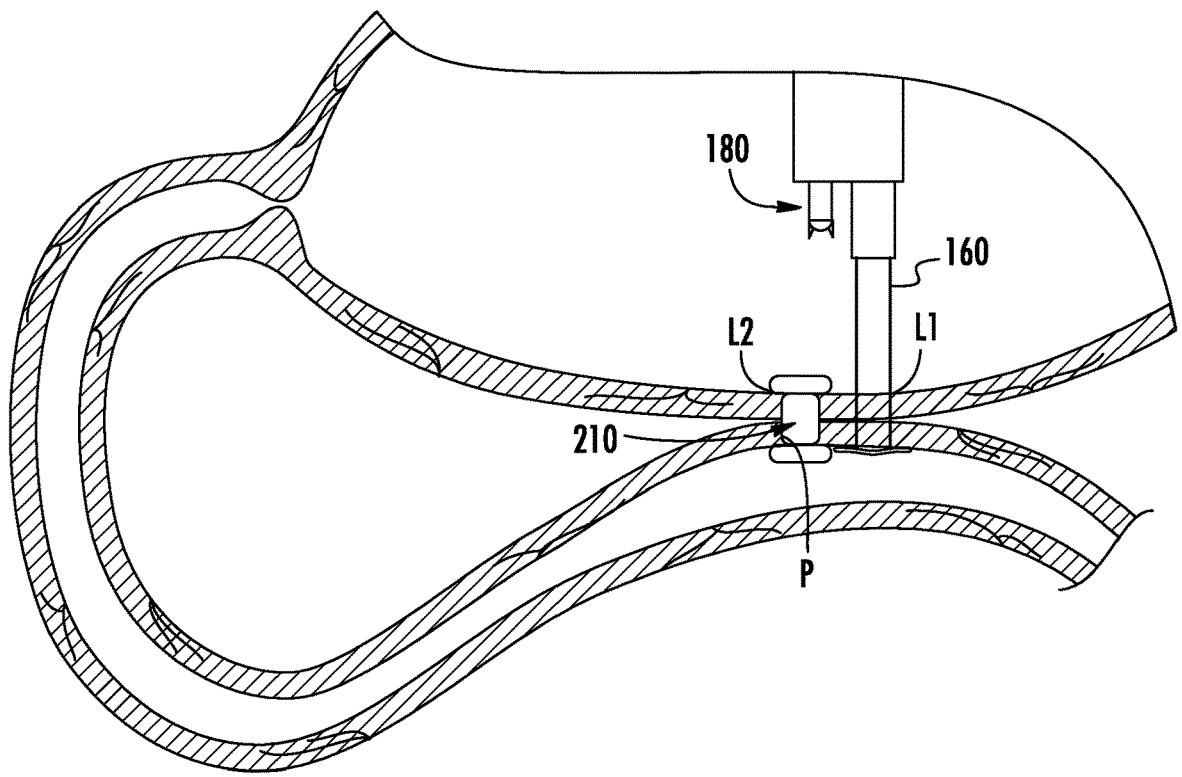

With the tissue walls PTW and DTW held together, a stent delivery system 180 may be advanced distally through the delivery device 110, as illustrated in FIG. 4E and FIG. 4F. If a single channel delivery device 110 is used, the stent delivery system 180 is delivered through the working channel through which the e-tube 130 and tissue-penetrating element 150 and suture element 160 had been delivered. If the delivery device 110 has more than one working channel, then the stent delivery system 180 may be delivered through another working channel within the delivery device 110 (e.g., extending along the working channel through which the e-tube 130 and the tissue-penetrating element 150 had been delivered and subsequently withdrawn). The stent delivery system 180 may include a stent delivery e-tube 190 with a lumen 192 through which a stent delivery device 200 and a stent 210 may be delivered. The stent delivery device 200 has a distal end 201 configured and/or shaped to create a passage P through the tissue walls PTW and DTW (such as by penetrating the tissue walls PTW and DTW) through which the stent 210 may be passed and deployed. In accordance with certain principles of the present disclosure, the passage P created by the stent delivery device 200 is at a second location L2 spaced from the first location L1 at which the suture element 160 maintains the tissue walls PTW and DTW in apposition. The suture element 160 may facilitate penetration of the tissue walls PTW and DTW by the stent delivery device 190 by maintaining tension on the tissue walls PTW and DTW and/or by simply holding the tissue walls PTW and DTW in close apposition (with the added benefit of the stent delivery device 190 penetrating substantially directly into the distal tissue wall DTW from the proximal tissue wall PTW). The lines of the suture element 160 may also serve as a target for placement of the stent 210 and/or targeting of the stent delivery device 200 for penetrating the tissue walls PTW and DTW at the second location L2.

In some embodiments, the stent 210 is expandable from a compact unexpanded delivery configuration to an expanded deployed configuration. The stent delivery device distal end 201 may be sized to create a passage P through the tissue walls PTW and DTW with an inner diameter sufficient to allow the stent 210 to fit therethrough in its delivery configuration with a delivery configuration outer diameter. The stent 210 may then expand, in a position extending through the tissue walls PTW and DTW, to its deployed configuration with a deployed outer diameter larger than the delivery configuration outer diameter. The stent 210 may include distal and proximal retention members 212, 214, respectively, such as in the form of flanges, to inhibit undesired movement of the stent 210 out of the passage P through the tissue walls PTW and DTW at the second location L2. It will be appreciated that the second anchoring element may be in other configurations than a stent/expandable stent without departing from the scope and spirit of the present disclosure.

Figure 5:
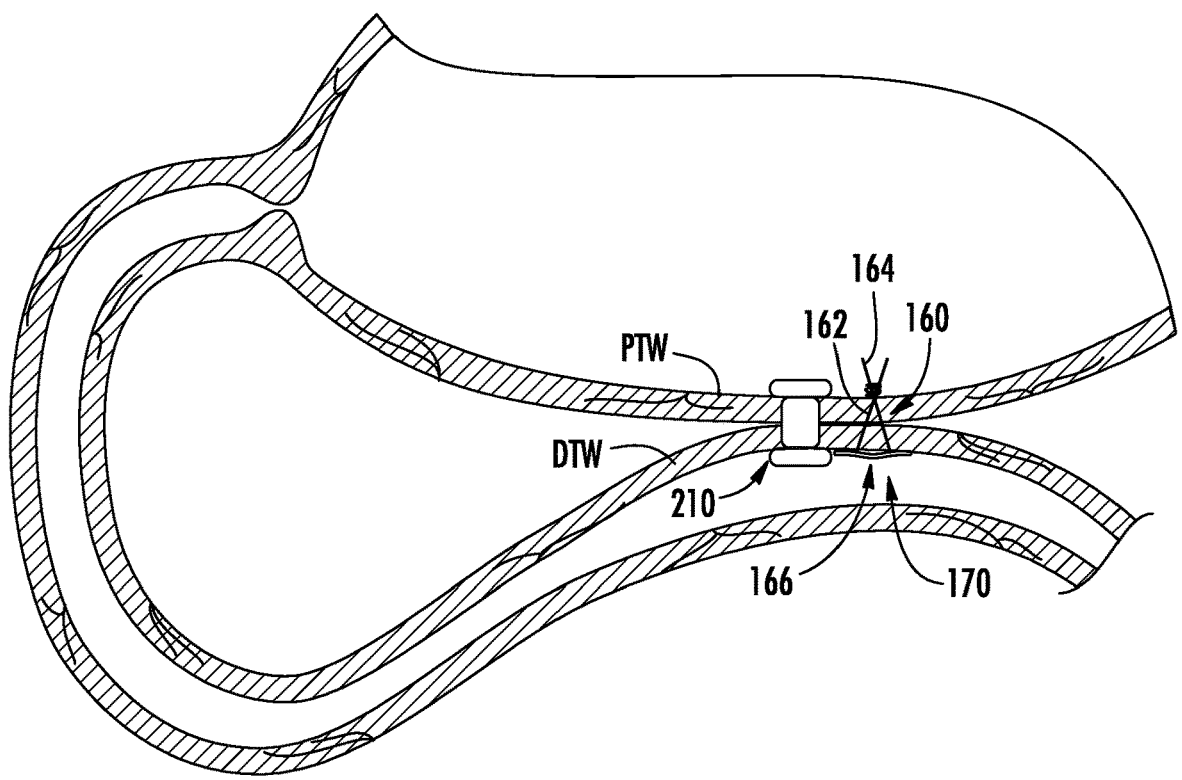
FIG. 5 illustrates an example of a configuration of tissue anchoring elements deployed in accordance with some aspects of the present disclosure.
Figure 6:
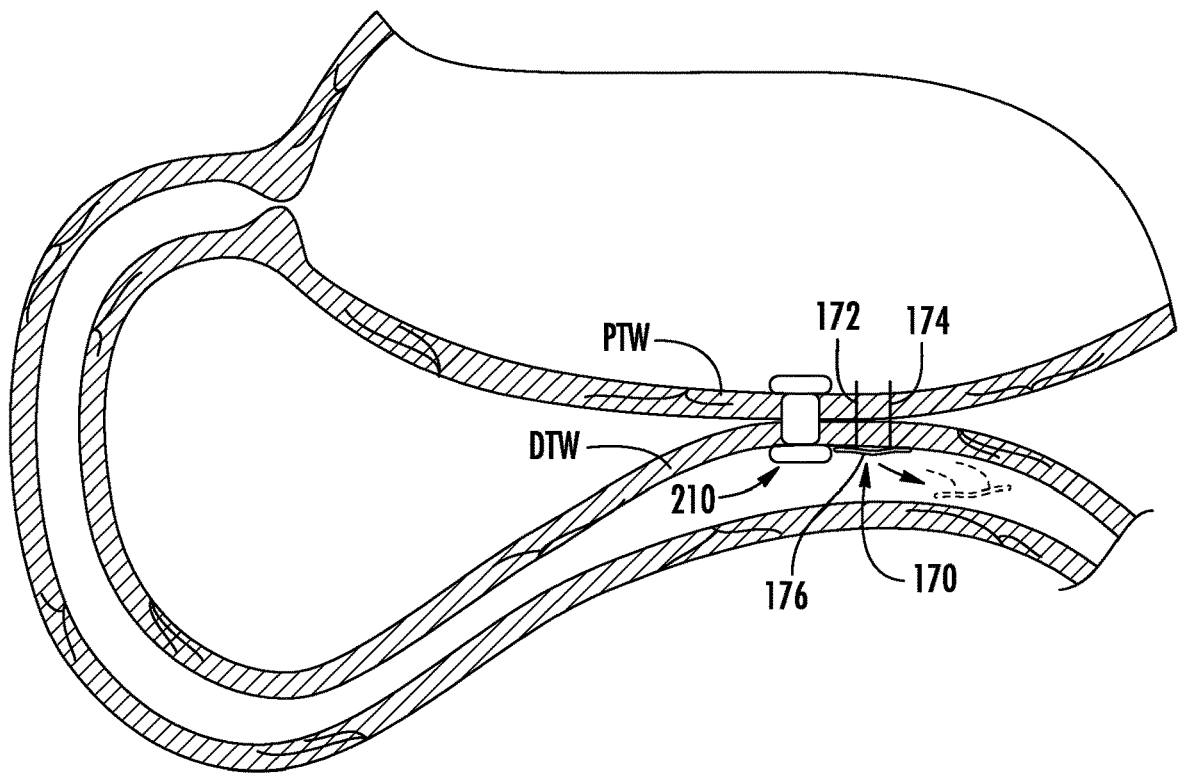
FIG. 6 illustrates an alternative example of a configuration of tissue anchoring elements deployed in accordance with some aspects of the present disclosure.

Once the stent 210 has been delivered and deployed, the suture element 160 may be deployed as well. In one example, as illustrated in FIG. 5, the legs 162, 164 of the suture element 160 may be cut and the ends adjacent the proximal tissue wall PTW may be tied or otherwise secured together to hold the suture element 160 in place holding the tissue walls PTW and DTW in apposition. In an alternate example, as illustrated in FIG. 6, the suture legs 162, 164 may be cut and the section of the remaining suture element 160 (e.g., the middle region 166 of the suture element 160 and/or the suture anchor 170) may be permitted to fall into the lumen or organ associated with the distal tissue wall DTW (e.g., the small bowel) to be removed by the body.

It will be appreciated that the system 100 disclosed herein extends in a relatively straight path, and therefore presents a lower risk of damage to the delivery device 110 than may be presented if the delivery device 110 extended through a more tortuous path, such as through the intestinal tract. Also, the tissue-penetrating element 150 used to deliver the suture element 160 generally may be a smaller gauge than needles or other tissue-penetrating elements used to create a passage for delivery of a stent. In some embodiments, the tissue-penetrating element 150 has a smaller diameter than (such as less than half) that of the typical e-tube 130 (e.g., to allow sufficient room for the suture element 160 to extend along the tissue-penetrating element 150 within the lumen of the e-tube 130). As such, the suture element 160 and the tissue-penetrating element 150 penetrate the tissue walls with a significantly smaller penetration diameter than created by the stent delivery device distal end 201 and the stent 210. For instance, a tissue-penetrating element 150 for delivering and deploying a suture element 160 may be an approximately 18-22 gauge (1.27 mm-0.718 mm) needle, whereas an e-tube 130 for delivering the stent 210 typically is approximately 10.8 French (3.6 mm). Moreover, it will be appreciated that the diameter of the passage P created by the stent delivery device distal end 201 (which may have a smaller diameter than the expanded diameter of the stent 210 when deployed) and the outer diameter of the stent in its deployed configuration may be larger than twice the thickness of the suture element 160 (e.g., thickness of a strand of suture forming the suture element 160). A single strand of suture filament may be less than half the outer diameter of the stent 210 when in a deployed configuration. Even if a double strand of suture filament is used, the outer diameter of the stent 210 in its deployed configuration extending through the apposed tissues is greater than the thickness or diameter of the suture element extending through the apposed tissues. More specifically, the thickness of a suitable suture is generally less than about 1 mm, and may be as low as approximately 0.2 mm, whereas the deployed diameter of a stent saddle region spanning across apposed tissues to form an anastomosis therebetween is generally approximately 10 mm or greater. Even if a stent as small as 6 mm in diameter is used, and a double loop of suture material with a thickness of approximately 1 mm (with two legs of suture filaments extending through the tissue) is used, such stent would be approximately three times the width of such double-stranded suture element. Thus, even if a loop of suture material is used, the stent 210 is significantly (at least approximately 200% and even as much as approximately 500%, including increments of 1% therebetween) larger in diameter than the diameter of the suture element 160. Accordingly, the use of a suture element 160 to secure tissue may cause less trauma to the apposed tissues (than may be caused by larger devices) while securely holding the tissues in place. Moreover, the suture element 160 presents minimal risk of leakage and improved joining of the tissue walls PTW and DTW in comparison with prior anastomosis systems.

Although embodiments of the present disclosure have been described with specific reference to techniques and systems for creating an anastomosis, it is appreciated that various other techniques and systems implants may benefit from the structures, devices, systems, and/or methods disclosed herein. The devices, instruments, tools, etc. of the present disclosure are not limited, and may include a variety of medical devices, instruments, tools, etc. for accessing body passageways, including, for example, duodenoscopes, catheters, ureteroscopes, bronchoscopes, colonoscopes, arthroscopes, cystoscopes, hysteroscopes, and the like. A delivery device used herewith may be any suitable size, cross-sectional shape, or area, and/or configuration permitting introduction and passage of medical instruments to the distal end of the delivery device. It is generally beneficial for the delivery device to be steerable, and the delivery device may have different areas of different flexibility or stiffness to promote steerability. The delivery device may include one or more working channels extending substantially longitudinally (axially) between the proximal end and the distal end of the delivery device. The delivery devices and/or overtubes associated therewith may be made from any suitable biocompatible material known to one of ordinary skill in the art and having sufficient flexibility to traverse non-straight or tortuous anatomy. Such materials include, but are not limited to, rubber, silicon, synthetic plastic, stainless steel, metal-polymer composite; metal alloys of nickel, titanium, copper cobalt, vanadium, chromium, and iron; superelastic or shape memory material such as nitinol (nickel-titanium alloy);

different layers of different materials and reinforcements. Such materials may be made of or coated with a polymeric or lubricious material to enable or facilitate passage of a deliver device therethrough. In some embodiments, the working channels may be made of or coated with a polymeric or lubricious material to facilitate passage of the introduced medical instrument(s) through the working channel(s).

The foregoing discussion has broad application and has been presented for purposes of illustration and description and is not intended to limit the disclosure to the form or forms disclosed herein. It will be understood that various additions, modifications, and substitutions may be made to embodiments disclosed herein without departing from the concept, spirit, and scope of the present disclosure. In particular, it will be clear to those skilled in the art that principles of the present disclosure may be embodied in other forms, structures, arrangements, proportions, and with other elements, materials, and components, without departing from the concept, spirit, or scope, or characteristics thereof. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. While the disclosure is presented in terms of embodiments, it should be appreciated that the various separate features of the present subject matter need not all be present in order to achieve at least some of the desired characteristics and/or benefits of the present subject matter or such individual features. One skilled in the art will appreciate that the disclosure may be used with many modifications or modifications of structure, arrangement, proportions, materials, components, and otherwise, used in the practice of the disclosure, which are particularly adapted to specific environments and operative requirements without departing from the principles or spirit or scope of the present disclosure. For example, elements shown as integrally formed may be constructed of multiple parts or elements shown as multiple parts may be integrally formed, the operation of elements may be reversed or otherwise varied, the size or dimensions of the elements may be varied. Similarly, while operations or actions or procedures are described in a particular order, this should not be understood as requiring such particular order, or that all operations or actions or procedures are to be performed, to achieve desirable results. Additionally, other implementations are within the scope of the following claims. In some cases, the actions recited in the claims can be performed in a different order and still achieve desirable results. The presently disclosed embodiments are therefore to be considered in all respects as illustrative and not restrictive, the scope of the claimed subject matter being indicated by the appended claims, and not limited to the foregoing description or particular embodiments or arrangements described or illustrated herein. In view of the foregoing, individual features of any embodiment may be used and can be claimed separately or in combination with features of that embodiment or any other embodiment, the scope of the subject matter being indicated by the appended claims, and not limited to the foregoing description.

In the foregoing description and the following claims, the following will be appreciated. The phrases "at least one", "one or more", and "and/or", as used herein, are open-ended expressions that are both conjunctive and disjunctive in operation. The terms "a", "an", "the", "first", "second", etc., do not preclude a plurality. For example, the term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

The following claims are hereby incorporated into this Detailed Description by this reference, with each claim standing on its own as a separate embodiment of the present disclosure. In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. Reference signs in the claims are provided merely as a clarifying example and shall not be construed as limiting the scope of the claims in any way.

What is claimed is:

1. A system for anchoring tissue within a patient's body, said system comprising:
   a flexible elongate member having at least one lumen defined therethrough;
   a first tissue-penetrating element having a distal end;
   a first anchoring element including a suture having a length extending proximally from the distal end of the first tissue-penetrating element, longitudinally along the exterior of the first tissue-penetrating element, and to a proximal end accessible outside the patient's body by a medical professional;
   a second tissue-penetrating element; and
   a second anchoring element;
   wherein:
   said suture and said second tissue-penetrating element are sized to extend through said flexible elongate member simultaneously with said suture serving as a target for delivery of said second anchoring element;
   said first anchoring element includes a suture anchor extending distal to, across, and around the exterior of the distal end of said first tissue-penetrating element; and
   said suture anchor includes a flexible portion with wings formed from a soft material and which flare outwardly from a collapsed configuration against the exterior of the first tissue-penetrating element upon deployment and in response to proximal pulling on the proximal end of said suture to cause said wings to extend across the tissue to provide a greater surface area for contact with the tissue than provided by said suture, the soft material of said wings not damaging the tissue when pulled in tension against the tissue.

2. The system of claim 1, wherein:
said first tissue-penetrating element has a sharpened distal end configured to penetrate the tissue at a first location to deliver said first anchoring element to the tissue; and
said second tissue-penetrating element has a sharpened distal end configured to penetrate the tissue at a second location spaced apart from the first location to deliver said second anchoring element to the tissue.

3. The system of claim 2, wherein:
said first tissue-penetrating element distal end has an outer diameter; and
said second tissue-penetrating portion distal end has an outer diameter greater than the outer diameter of said first tissue-penetrating element distal end.

4. The system of claim 3, wherein
said second anchoring element is expandable from a delivery configuration with a delivery configuration outer diameter greater than twice the thickness of said suture, to a deployed configuration with a deployed outer diameter greater than the delivery configuration outer diameter.

5. The system of claim 4, wherein the outer diameter of said second tissue-penetrating element distal end is sized to create a passage through the tissue through which said second anchoring element may pass in the delivery configuration.

6. The system of claim 1, wherein
said second anchoring element is expandable from a delivery configuration with a delivery configuration outer diameter greater than twice the thickness of the suture, to a deployed configuration with a deployed outer diameter greater than the delivery configuration outer diameter.

7. The system of claim 1, wherein:
said suture loops around the distal end of said first tissue-penetrating element; and
said first tissue-penetrating element is a needle with blunt grooves through which said suture extends and is carried to the tissue, and sharp regions for penetrating the tissue to carry the suture through the tissue.

8. The system of claim 1, wherein said suture and said second tissue-penetrating element are sized to extend through the same lumen through said flexible elongate member.

9. A system for anchoring tissue, said system comprising:
a flexible elongate member having at least one lumen defined therethrough;
a first tissue-penetrating element extendable through the flexible elongate member;
a suture element having a middle region looping distal to and around the exterior of a distal end of said tissue-penetrating element, and a suture line on either side of the middle region and extending proximally and longitudinally along the exterior of the first tissue-penetrating element for control by a user, said suture element including wings formed of a soft material and which flare outwardly from said middle region of said suture element, and from a position along the exterior of the tissue-penetrating element, in response to proximal pulling of said suture element and said wings against tissue, the soft material of said wings not damaging the tissue when pulled in tension against the tissue;
a second tissue-penetrating element extendable through said flexible elongate member while said suture element is extended through said flexible elongate member with said suture element serving as a target for penetrating the tissue; and
a stent;
wherein said suture line on either side of the middle region of said suture element and exterior to the tissue-penetrating element is positioned to serve as a target for placement of said stent.

10. The system of claim 9, wherein:
said first tissue-penetrating element has a distal end configured to penetrate the tissue at a first location to deliver said suture element through the tissue at the first location; and
said second tissue-penetrating element is configured to deliver said second anchoring element to the tissue and has a sharpened distal end configured to penetrate the tissue at a second location spaced apart from the first location.

11. The system of claim 9, wherein:
said suture element is a suture thread;
said first tissue-penetrating element is a needle with blunt grooves through which said suture thread extends and is carried to the tissue, and sharp regions for penetrating the tissue to carry the suture element through the tissue; and
said suture element further comprises a suture anchor positioned along said suture thread and extending in said blunt grooves of said needle.

12. The system of claim 9, wherein said suture element further comprises a suture anchor positioned along said suture thread at the distal end of said first tissue-penetrating element.

13. The system of claim 9, wherein:
said suture element and said stent are delivered to the tissue at a distal end of said system;
said system further comprises a control handle at a proximal end of said system; and
said suture thread has suture legs extending proximally to said control handle for access by a user.

14. The system of claim 13, further comprising a suture delivery device extending distally from said control handle and having a wall defining a lumen therethrough through which said first tissue-penetrating element and said suture extend distally to the tissue, wherein at least one hole is defined in the suture delivery device wall through which said suture legs pass to extend along said control handle.

15. The system of claim 14, wherein said control handle includes guides through which said suture legs extend.

16. The system of claim 13, wherein said control handle includes guides through which said suture legs extend.

17. A method of drawing tissue walls together, said method comprising:
inserting a suture element through a delivery device and to a first location on a proximal tissue wall and through a distal tissue wall;
pushing a tissue-penetrating element to push a suture anchor portion of the suture element positioned distal to and across the exterior of a distal end of the tissue-penetrating element through the proximal tissue wall and the distal tissue wall;
securing a portion of the suture element relative to the tissue walls;
moving a suture line on both sides of the secured portion of the suture element proximally along the exterior of the tissue-penetrating element to cause wings of the secured portion of the suture element to extend across the tissue to increase the surface area of the secured portion of the suture element for contact with tissue and to draw the distal tissue wall proximally towards the proximal tissue wall without damaging the tissue;

holding the proximal and distal tissue walls together with the suture element; and inserting a tissue anchoring element through the delivery device alongside the suture line, using the suture line as a target, and to a second location on the proximal tissue wall spaced apart from the first location and along the suture line, and through the distal tissue wall.

18. The method of claim 17, further comprising securing the suture element in place relative to the tissue walls to remain in place after withdrawal of the delivery device.

19. The method of claim 17, further comprising releasing the suture element after insertion of the tissue anchoring element and withdrawal of the delivery device to allow the suture element to be released from the tissue walls.

20. The method of claim 17, wherein:

the tissue walls are sections of the digestive tract; and the tissue anchoring element is a stent having a passage therethrough to create an anastomosis connecting the sections of the digestive tract.

\* \* \* \* \*